Figure 1:
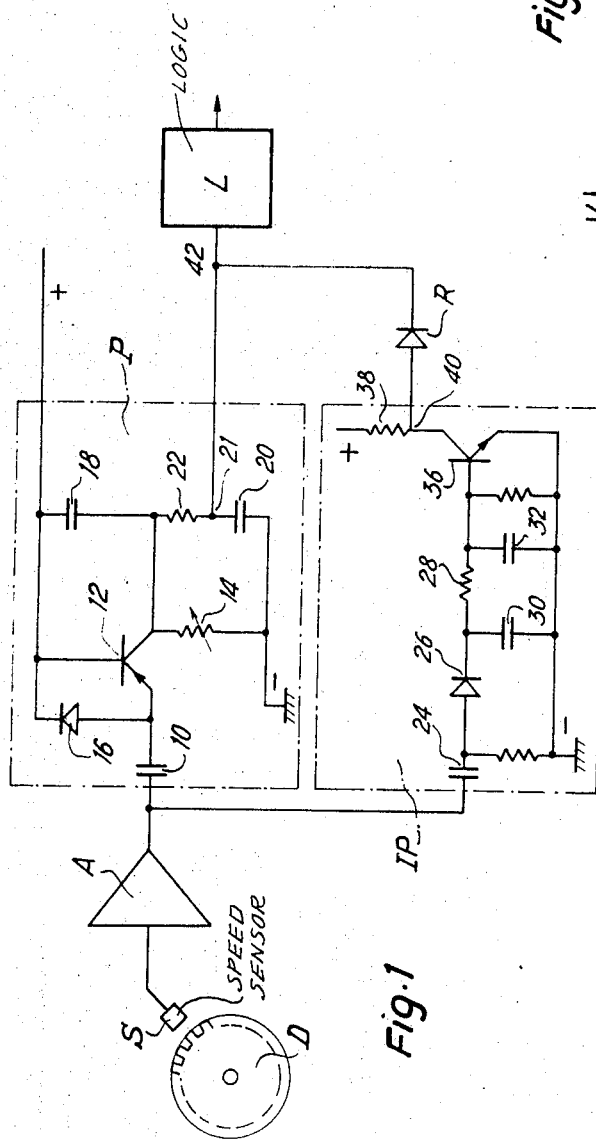

United States Patent [19]
Marouby

[11] 3,782,784
[45] Jan. 1, 1974

[54] VOLTAGE CONVERTER APPLYING AN ANTISKID LOGIC ELEMENT

[75] Inventor: Guy Marouby, Neuilly, France

[73] Assignee: Societe Anonyme D.B.A., Clichy, France

[22] Filed: Apr. 19, 1972

[21] Appl. No.: 245,333

[30] Foreign Application Priority Data
May 4, 1971  France.............................. 7115961

[52] U.S. Cl................ 303/21 R, 307/233, 307/261, 307/295, 328/127, 328/140
[51] Int. Cl.............................................. B60t 8/00
[58] Field of Search...................... 188/181; 303/20, 303/21; 307/233, 261, 295; 324/161–162, 78 E; 328/24, 127, 136, 140; 340/52 R, 262–263

[56] References Cited
UNITED STATES PATENTS

| | | | |
|---|---|---|---|
| 3,652,134 | 3/1972 | Hiscox | 303/21 CG |
| 3,642,329 | 2/1972 | Zechnall et al. | 303/21 BE |
| 3,614,634 | 10/1971 | Jones et al. | 307/233 X |
| 3,584,298 | 6/1971 | Kolbiaz | 307/233 X |
| 3,535,004 | 10/1970 | Howard et al. | 303/21 EB |

*Primary Examiner*—Duane A. Reger
*Assistant Examiner*—Stephen G. Kunin
*Attorney*—Ken C. Decker et al.

[57] ABSTRACT

A voltage converter set designed to feed an antiskid logic element and to modify the wheel speed sensor signals.

The converter set includes a proportional converter and an inversely proportional converter, connected through a diode, so that the output voltage of the converter set is higher for the low wheel speeds. The invention also provides the combination of several converter sets with a single antiskid logic element in a circuit of the exclusive "OR" or "SELECT LOW" type.

4 Claims, 6 Drawing Figures

VOLTAGE CONVERTER APPLYING AN ANTISKID LOGIC ELEMENT

The invention relates essentially to a voltage converter set designed to feed an anti-skid logic element and to deliver to this element a voltage representing the speed of rotation of a wheel after the conversion of electrical signals from a sensor/amplifier unit.

The converter set in accordance with the invention is designed to be situated between at least one electric generator associated with a vehicle wheel and the input of an electronic logic element of an anti-skid circuit controlling the application or release of the braking means of the vehicle and comprising at least one proportional converter situated between the output of the generator and the input of the said logic element in order to supply the latter with a direct-current voltage of given polarity proportional to the speed of rotation of the wheel. It is characterised in that it also comprises another converter of the inversely proportional type associated with the proportional converter and having an input connected to the generator and an output connected by a diode or the like provided at the input of the logic element so that the said other converter applies to the logic element a direct-current voltage inversely proportional to the speed of rotation of the wheel when this voltage is greater than the voltage supplied by the proportional converter.

According to another feature of the invention, the voltage across the terminals of the proportional converter becomes zero at a low speed of rotation of the wheel associated with the generator and the voltage across the terminals of the inversely proportional converter is zero at substantially the same speed whereas it increases with decreasing speed below the said low speed, the voltage across the terminals of the proportional converter then being zero.

According to a further feature of the invention, the voltage across the terminals of the inversely proportional converter increases much faster with decreasing wheel speed below the said low speed than the voltage across the terminals of the proportional converter increases with increasing wheel speed above the said low speed.

Known electric braking systems have a proportional converter situated between the sensor/amplifier unit and the input of the anti-skid logic element. When the rotational speed of the wheel controlled is close to zero, therefore, the voltage delivered by the converter to the logic element is almost zero, and since stray voltages superimpose themselves on the substantially zero voltage it is difficult to use this reference to control the electronic system. The electronic system then fails and no longer "knows" whether the hydraulic braking pressure must be relaxed or reapplied when the vehicle stops.

A converter set embodying the invention, as defined above, enables this disadvantage to be overcome. If the set with only a proportional converter is combined with a converter of the inversely proportional type whose input is connected to the sensor/amplifier unit and whose output is connected by a suitably poled diode to the input of the logic element, the said converter set supplies the logic element at speeds close to zero with voltages slightly greater than the stray voltages which the logic element can use. Also, the voltages applied to the logic element increase rapidly with slowly decreasing speed until the speed drops to zero, and the logic element receives increasing voltages simulating an increase in the wheel speed although the wheel is slowing down, at a low speed, with the result that the brake associated with the wheel can be operated hydraulically until the wheel has come to a stop.

An additional advantage can be obtained if, in accordance with another feature of the invention, the converter set comprises a plurality of groups of proportional and inversely proportional converters connected together in pairs by a diode and connected respectively to electric generators, one group per wheel controlled, the said groups being connected to the (single) logic element by means of a conventional circuit of the "SELECT LOW" type. The additional advantage lies in the fact that, in the case of a device embodying the invention, when one wheel is locked the corresponding voltage applied to the "SELECT LOW" circuit is high, and the logic element is then controlled by a wheel which is running at a low speed but is still rotating, that is to say, supplying a lower voltage than that corresponding to the locked wheel. As will be explained in more detail in the following description, the electronic device not only prevents locking of a wheel threatening to lock, but also permits a wheel already locked to be set in motion again if there is a logic element and hydraulic system common to all the wheels.

Figure 2:
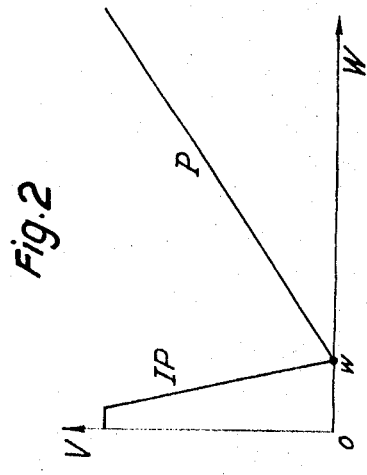
Figure 3:
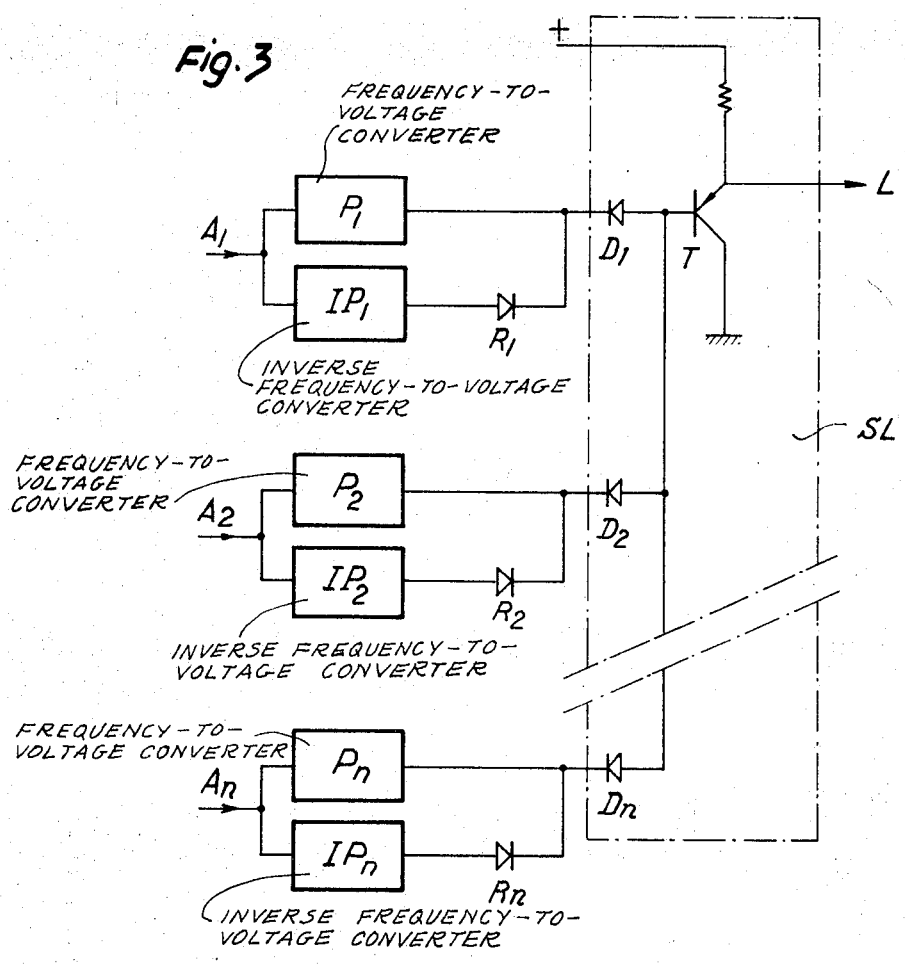
Figure 4:
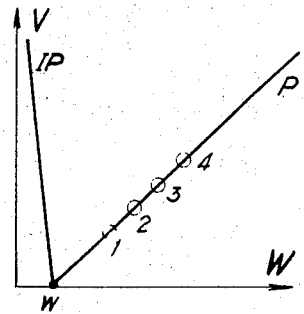
Figure 5:
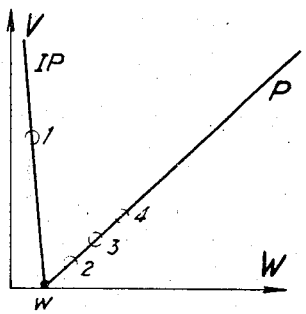
Figure 6:
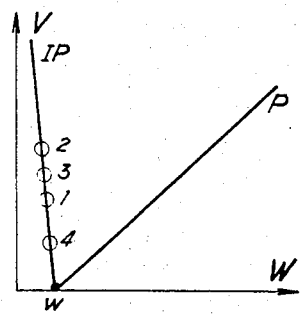

The invention will be better understood from the following description referring to the accompanying drawings, in which :

FIG. 1 represents a converter set embodying the invention, associated with a sensor/amplifier unit and with an anti-skid logic element, FIG. 2 represents the response curve for the set illustrated in FIG. 1, FIG. 3 represents a converter set embodying the invention with a plurality of converter groups connected to the input of an anti-skid logic element by a circuit of the exclusive "OR" type, and FIGS. 4 to 6 show curves similar to those in FIG. 2, with various operating points for a plurality of wheels which control the anti-skid logic element.

FIG. 1 is a diagram of an electronic anti-skid control circuit embodying the invention, with a sensor S in front of which a toothed disc D attached to the wheel of a vehicle rotates, and which feeds a signal to an amplifier A. After amplification the signal is applied to a group comprising a proportional "frequency-to-voltage" converter P and an inversely proportional "frequency-to-voltage" converter IP at the input of a conventional anti-skid logic element L. A diode R is inserted between the converter IP and the logic element L before the point at which the converter P is connected to the logic element. The diode R is poled so that voltages from the converter IP greater than those from the converter P are applied to the logic element. The output of the logic element is connected to a hydraulic system (not shown), to which it feeds admission or shut-off signals to apply or release the brake of the vehicle wheel monitored by the sensor S.

The electronic circuits of the "frequency-to-voltage" P and IP converters shown in FIG. 1 will now be described.

The converter P has an input capacitor 10 connected both to the amplifier A and to the emitter of a PNP transistor 12 whose base is connected to the higher tension, the collector being connected by way of a varaible resistor 14 to earth, which is at the lower tension. A diode 16 is provided between the base of the transistor 12 and its emitter. This diode 16 is conductive in respect of negative voltages. The collector of the transistor 12 is connected to the higher tension by a capacitor 18 and to the lower tension by an assembly comprising a capacitor 20 and resistor 22 in series, this assembly being mounted in parallel with the variable resistor 14. The output of the converter P appears at a point 21 between the resistor 22 and the capacitor 20. The capacitors 18 and 20 and resistor 22 are selected to give the desired response time for the converter.

The inversely proportional converter IP has an input capacitor 24 connected both to the amplifier A and, by a diode 26 and a filter comprising a resistor 28 and capacitors 30 and 32, to a NPN transistor 36. The emitter of this transistor is connected directly to earth, which is at negative high tension, and its collector is connected by a resistor 38 to the positive high tension. A point 40 between the collector of the transistor 36 and the resistor 38 forms one output terminal of the converter IP, the other output terminal being the earth. The output 40 is connected to the output 21 of the converter P by a diode R or similar element conductive in the direction away from 40 and towards 21. The set comprising P, IP and R therefore has two output terminals : the higher tension, and the connecting point 42 to which the lines from the terminal 21 and from the diode R lead. This point 42 is connected to the input of the logic element L.

The set shown in FIG. 1 operates as follows. It delivers to the logic element L a voltage V, dependent on the speed of the wheel associated with the sensor S and shown on the curve in FIG. 2. The converter P provides a voltage proportional to the speed of rotation of the wheel and represented by the curve branch P when this speed is between the maximum speed of the vehicle and a low speed $w$ of the order of 2 km/h, at which the voltage V becomes zero. From this value $w$, the converter IP supplies a voltage inversely proportional to the speed and increasing with decreasing speed below $w$. It will be appreciated that beyond the point $w$, as mentioned in the preamble, the logic element receives information in the form of voltages increasing with decreasing speed and behaves as if the wheel were accelerating, with the result that it permits free operation of the braking means without interfering with them.

Again as already stated, an even more useful result is obtained if the set of converters associated with the logic element includes a plurality of groups of converters, each group comprising a proportional and an inversely proportional converter and a diode connected to the logic element by a "SELECT LOW" or exclusive "OR" circuit.

An arrangement of this kind is shown in FIG. 3. Amplifiers A1, A2.. A$n$ (FIG. 3) associated with respective sensors and wheels (not shown) apply to converter/diode groups P1, IP1, R1 ; P2, IP2, R2; ... P$n$, IP$n$, R$n$ positive direct-current pulses at the diodes D1, D2 ... D$n$ of a known "SELECT LOW" circuit SL. The latter comprises a PNP transistor T of which the base is connected to the various diodes D1, D2 ... D$n$, the collector to earth and the emitter both to the input of the logic element and, by way of a suitable resistor, to the higher tension.

As just described, the circuit shown in FIG. 3 feeds to the logic element L the lowest of the voltages applied to the diodes D1, D2, D$n$. The voltages applied to these diodes are proportional to the speed of rotation of the wheel concerned and are of the type illustrated on the curve in FIG. 2. The positive direct-current voltage fed by the transistor T to the logic element L will therefore be a voltage which may equally well lie on either branch P or IP of the curve for the associated wheel and which will be the lowest of the voltages applied to the circuit SL. In fact the circuit SL will generally feed the logic element L with voltages situated on the branch P, since with a low and gradually decreasing wheel speed below $w$ the voltage will rise rapdily when a given wheel is close to locking and therefore only the voltages for operating points situated on branch P will be taken into account. This arrangmenet naturally has an advantage over the device having only a proportional converter to feed each diode, in which the SL circuit ceased to give any information concerning moving wheels once the speed of one wheel has reached zero.

FIGS. 4 to 6 represent the superimposed curves V = $f$(W), assumed to be identical, for the four wheels of a vehicle. Small circles indicate the operating points for the various speeds and voltages of these four wheels. It should be noted that the curves V = $f$(W) might of course be different for the different axles, giving different $w$ values for the various axles. In FIG. 4 the four operating points 1 to 4 for the various wheels are situated on branch P. In this case all the wheels are turning. Wheel 1 is turning at the lowest speed, and it is the voltage from this wheel's converter set which will be applied to the logic element L by the circuit SL. On receiving this information the logic element L will send signals to the hydraulic system operating the brakes after analyzing the deceleration conditions for the wheel whose operating point is 1.

FIG. 5 illustrates a case in which the anti-skid system has not operated sufficiently effectively and the wheel whose operating point is 1 has continued to slow down and has reached a speed lower than the speed $w$. As FIG. 5 shows the other wheels (points 2 to 4) have also slowed down, and the logic element L will now be controlled by the wheel represented by point 2. If the deceleration of the latter wheel is considered excessive by the logic element, this element will order the hydraulic system to release the brakes. All the wheels, including wheel 1, will benefit from this order, and the point 1 will return to branch P as in FIG. 4.

In FIG. 6 all the operating points 1 to 4 are on branch IP of the characteristic curve. This may occur by chance or after braking suitably controlled by the anti-skid device. The logic element L receives information corresponding to the lowest voltage, that is, to point 4, and during further deceleration of the vehicle it interprets the information received as acceleration because the voltage V is rising. As a result the logic element does not send any signal interfering with braking, and the driver can stop the vehicle as if the anti-skid device did not exist.

I claim :

1. In a vehicle having a wheel and a brake controlling said wheel, an adaptive braking system for controlling said brake comprising:

first means for generating a first signal directly proportioned to the rotational velocity of said wheel;

second means for generating a second signal inversely proportional to the rotational velocity of said wheel;

logic means having an output terminal, and an input terminal operatively connected to said first and second means for receiving said first and second signals, said logic means being responsive to the signal transmitted to the input terminal for sensing an incipient skidding condition of said wheel and generating a signal at said output terminal for relieving braking pressure in said brake; and means inhibiting said second signal when the value of said first signal is greater than the value of said second signal but permitting transmission of said second signal to said input terminal when the value of said second signal is greater than the value of said first signal.

2. The invention of claim 1, wherein said first means generates a first signal having a value of zero at a relatively low wheel rotational velocity and said second means generates a second signal having a value of zero at substantially the same relatively low wheel rotational value that the first signal has a value of zero.

3. The invention of claim 2, wherein said second means increases the value of said second signal at a greater rate when the rotational velocity of said wheel decreases below said relatively low velocity than the rate at which said first means increases the value of said first signal as the rotational velocity is increased above said relatively low rotational velocity of said wheel.

4. The invention of claim 1, wherein said vehicle has a plurality of wheels with corresponding brakes controlling the wheels and corresponding first means, second means, and inhibiting means for each of said wheels, the output of each of said inhibiting means having a common connection with the output of a corresponding first means, each of said common connections being connected to the input terminal of said logic means through a diode.

* * * * *